(No Model.)
A. S. YÁÑEZ.
LAMP.
No. 368,800.    Patented Aug. 23, 1887.
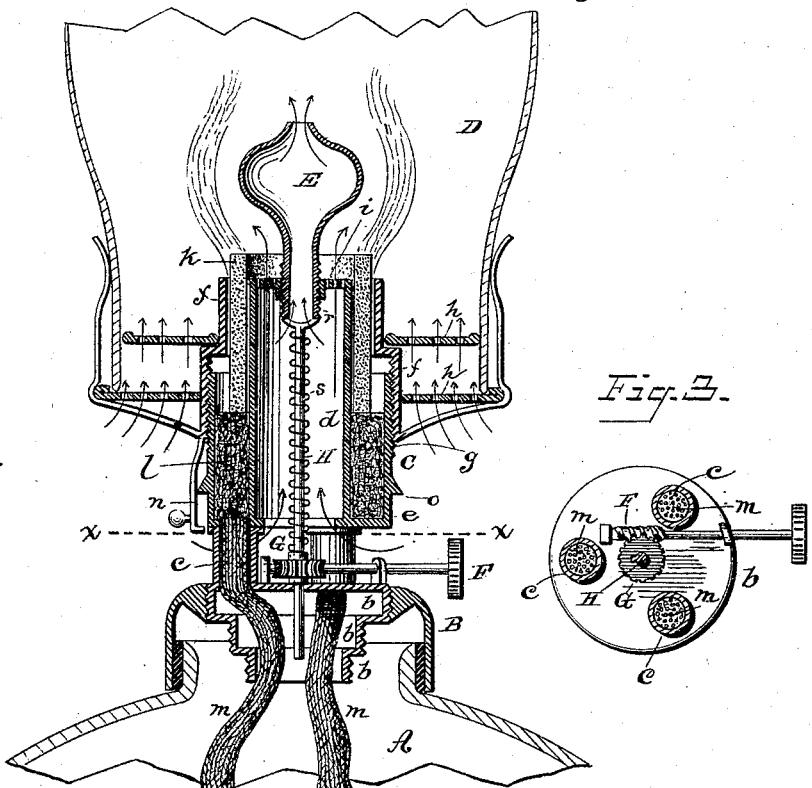
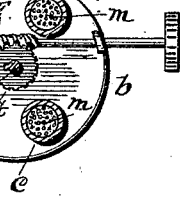
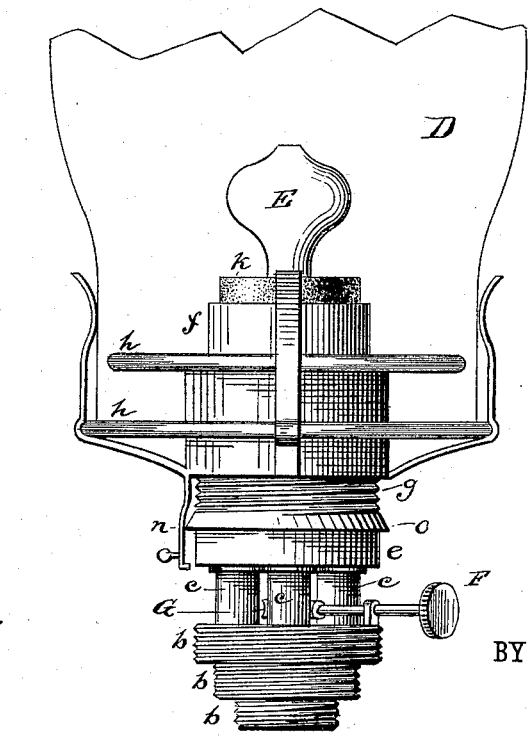
WITNESSES:
D. D. Mott
C. Sedgwick
INVENTOR:
A. S. Yáñez
BY Munn & Co.
ATTORNEYS.
N. PETERS, Photo-Lithographer, Washington, D. C.

United States Patent Office.

ADOLFO SÁENZ YÁÑEZ, OF HAVANA, CUBA.

LAMP.

SPECIFICATION forming part of Letters Patent No. 363,800, dated August 23, 1887.

Application filed November 1, 1886. Serial No. 217,725. (No model.)

*To all whom it may concern:*

Be it known that I, ADOLFO SÁENZ YÁÑEZ, of Havana, Cuba, at present residing in the city, county, and State of New York, have invented new and useful Improvements in Lamps, of which the following is a full, clear, and exact description.

This invention more particularly relates to lamps for burning various kinds of hydrocarbon fluids and oils, and in which an incombustible wick is used; and it consists in certain novel constructions and combinations of various parts of the lamp, substantially as hereinafter described, and pointed out in the claims.

Reference is to be had to the accompanying drawings, forming a part of this specification, in which similar letters of reference indicate corresponding parts in all the figures.

Figure 1 represents a side elevation of the burner and upper portion of a lamp embodying my invention, with attached shade shown only in part. Fig. 2 is a vertical section of the same, showing also a portion of the lamp-reservoir. Fig. 3 is a horizontal section upon the line $x\ x$ in Fig. 2, omitting the lamp cap and reservoir; and Fig. 4 is a partly-sectional plan, upon a larger scale, of a worm-wheel and feathered spindle used to raise or lower an interior flame-spreader, that serves to intensify the combustion of the gases as well as to enlarge the flame, and that may also operate as a reflector.

A is the reservoir of the lamp, made of any suitable material, shape, and size.

B is the lamp cap or top, C the burner, and D the lamp-shade.

The lamp cap or top B, which fits over the neck on top of the reservoir, is in the form of a ring constructed with an interior screw-thread for reception of the lower entering end of the burner, which is of a stepped-cone construction, being made up of two or more annular portions, $b\ b$, each upper one of which is of greater diameter than the one below it, and all of which are externally screw-threaded, to fit the lamp cap or top—that is, one portion $b$ for each lamp. This stepped-cone construction of the lower end of the burner provides for the burner being used on lamp caps or tops of different sizes.

The upper or body portion of the burner is connected with the lower portion, $b\ b$, by two or more (preferably three) wick-tubes, $c\ c$, which admit the air in between them to the interior of the body of the burner, which is a tubular or Argand one.

The body of the burner is composed mainly of an inner tube, $d$, an outer cylinder, $e$, through the bottom of which the wick-tubes $c\ c$ communicate, and an upper adjustable cylinder, $f$, of greater diameter for the lower portion of its length than for its upper portion, and having a screw-thread in its lower portion adapted to fit a screw-thread, $g$, upon the exterior of the upper portion of the outer cylinder, $e$.

The adjustable section or cylinder $f$ carries the shade D—that is, where a shade is used—and air is admitted to the exterior of the flame of the Argand burner through perforated diaphragms $h\ h$, arranged one above the other. Air is mainly admitted to the interior of the flame through the inner tube, $d$, of the burner-body and through a distributer or perforated diaphragm, $i$, on top of said tube.

The walls of the body of the burner serve to carry between them the upper portion of the wick, which is a compound one, and consists of an annular or tubular tip-piece, $k$, made of bath-brick, unglazed pottery, or other like porous incombustible material, that, when the lamp is burning, projects slightly above the burner, and is held in place by the tube $d$ and upper contracted portion of the cylinder $f$, between which portion of the walls of the burner the tubular tip-piece $k$ is loosely fitted. The lower end of the tubular tip-piece $k$ rests upon a loose filling, $l$, of fibrous material, arranged between the tube $d$ and the lower or main portion of the outer cylinder, $e$. The fluffy or loose filling $l$, which may be made by unraveling the upper ends of the wicks or wick-sections $m$, serves to freely supply the oil or fluid to the porous incombustible tip-piece $k$, that, by its absorption, keeps the flame supplied with the necessary burning gases or vapors, while the wicks $m$, that are of fibrous material and pass down through the tubes $c\ c$ into the reservoir A, supply by capillary action the oil or fluid to the loose filling $l$.

The amount of flame is regulated by screwing or unscrewing—that is, raising or lowering—the adjustable cylinder $f$ relatively to the top of the tip-piece $k$; or the flame may be extinguished by further raising the same, subject to the control of a spring-catch, n, carried by the adjustable section f, and which serves to prevent the detachment of the section f, when adjusted to its extreme upward position, by the catch coming in contact with an annular ledge, o, around the portion e of the burner-body. This spring-catch n, however, may be drawn out and liberated from such engagement whenever it is necessary to detach the parts of the burner.

The burner-body is centrally fitted at and above its top with a hollow flame-spreader, E, that also serves to intensify the light or combustion of the gases, and which, if made of suitable material, may also answer as a reflector. This flame-spreader, which has a clear passage up through it to keep it from becoming overheated and to supply air to the interior of the flame, is of bulb shape and made of any suitable material, with a lower screw-threaded shank portion, r, which passes down through a screw-threaded boss on the perforated top i of the tube d, whereby said spreader E may be adjusted up or down to project more or less up into the interior of the flame, as circumstances may require. This adjustment is effected by or through a finger-screw, F, arranged to engage with a slotted worm-wheel, G, which is fitted upon a feathered spindle, H, connected above with the screw-shank of the flame-spreader E. A spring, s, may be arranged around the spindle H, to keep the spreader E from slipping or falling.

Having thus described my invention, what I claim as new, and desire to secure by Letters Patent, is—

1. The combination, in an Argand lamp, of the outer lower screw-threaded cylinder, e, having a stop-ledge, o, and the screw-threaded adjustable upper cylinder, f, provided with the catch n, substantially as set forth.

2. The combination, with an Argand burner, of the hollow flame-spreader E, having an air-passage through it and provided with a lower hollow screw-shank, the inner burner-tube, d, having a perforated plate in its top provided with a central screw-threaded opening to receive the screw-shank r, the spindle H, carrying the said spreader, and mechanism for rotating said spindle to raise and lower the spreader, substantially as set forth, whereby the flame will be spread and concentrated at the top, substantially as set forth.

3. The combination, with the inner tube, d, of an Argand burner, having a perforated plate in its upper end provided with a central threaded aperture, of the spreader having a screw-threaded shank working in said threaded aperture, a spindle connected to the said shank, extending down through the tube, and provided with a vertical feather or spline, a horizontal worm-wheel on said splined part of the spindle, and a worm-screw engaging said worm-wheel, substantially as set forth.

4. The combination, with the tube d of an Argand burner, having a perforated plate in its top provided with a central threaded aperture, of the spreader having a threaded shank engaging said threaded aperture, the spindle H, connected to said shank and having a feather on its lower end, a worm-wheel on said feathered portion, means of operating said wheel to rotate the spindle, and a spring, s, on the spindle between its upper end and the said worm-wheel, substantially as set forth.

ADOLFO SÁENZ YÁÑEZ.

Witnesses:
EDGAR TATE,
C. SEDGWICK.